US009199657B2

(12) United States Patent
Martin (10) Patent No.: US 9,199,657 B2
(45) Date of Patent: Dec. 1, 2015

(54) COOLER TRANSPORTING DEVICE

(71) Applicant: Daniel Todd Martin, Lubbock, TX (US)

(72) Inventor: Daniel Todd Martin, Lubbock, TX (US)

(*) Notice: Subject to any disclaimer, the term of this patent is extended or adjusted under 35 U.S.C. 154(b) by 0 days.

(21) Appl. No.: 14/158,290

(22) Filed: Jan. 17, 2014

(65) Prior Publication Data

US 2015/0203141 A1    Jul. 23, 2015

(51) Int. Cl.
*B62B 1/22* (2006.01)
*B62B 5/00* (2006.01)
*A45C 11/20* (2006.01)
*A45C 5/14* (2006.01)
*A63C 17/00* (2006.01)

(52) U.S. Cl.
CPC ............. *B62B 5/0083* (2013.01); *A45C 5/143* (2013.01); *A45C 11/20* (2013.01); *B62B 1/22* (2013.01); *A63C 17/0093* (2013.01); *B62B 2204/06* (2013.01)

(58) Field of Classification Search
CPC ............ B62B 1/06; B62B 1/14; B62B 1/142; B62B 1/26; B62B 2202/12; B62B 2202/24; B62B 2202/52; B62B 2203/44; B62B 2203/60; B62B 1/18; B62B 1/20; B62B 1/22; F25D 3/08
USPC ................ 220/592.24, 592.03; 280/47.34
See application file for complete search history.

(56) References Cited

U.S. PATENT DOCUMENTS

| 107,405 | A | * | 9/1870 | Pilkington ............... 220/592.24 |
|---|---|---|---|---|
| 2,375,338 | A | * | 5/1945 | Alexander ............... 280/47.131 |
| 2,670,969 | A | * | 3/1954 | Costikyan ..................... 410/51 |
| 2,899,213 | A | * | 8/1959 | Winger ................. B62B 5/0083 410/45 |
| 4,166,638 | A | * | 9/1979 | De Prado ...................... 280/638 |
| 4,451,053 | A | * | 5/1984 | Alioa et al. ................ 280/47.26 |
| 4,790,559 | A | * | 12/1988 | Edmonds ...................... 280/655 |
| 4,846,493 | A | * | 7/1989 | Mason .......................... 280/641 |
| 4,873,841 | A | | 10/1989 | Bradshaw et al. |
| 4,976,448 | A | * | 12/1990 | Wickersham et al. ....... 280/47.2 |
| 5,018,930 | A | * | 5/1991 | Hardin et al. ................ 414/458 |
| 5,080,387 | A | * | 1/1992 | Ryals ............................ 280/645 |
| 5,169,164 | A | * | 12/1992 | Bradford ........................ 280/35 |
| 5,249,438 | A | | 10/1993 | Rhaney et al. |
| 5,259,215 | A | * | 11/1993 | Rocca ............................ 62/371 |
| 5,285,656 | A | | 2/1994 | Peters |
| 5,313,817 | A | | 5/1994 | Meinders |
| 5,373,708 | A | | 12/1994 | Dumoulin, Jr. |
| D358,921 | S | * | 5/1995 | Abbema ....................... D34/26 |
| 5,465,996 | A | * | 11/1995 | Wisz ............................ 280/651 |
| 5,598,943 | A | * | 2/1997 | Markus .................... 220/592.03 |
| 5,988,658 | A | * | 11/1999 | Ritchie et al. .............. 280/47.26 |

(Continued)

*Primary Examiner* — Katy M Ebner
*Assistant Examiner* — Emma K Frick
(74) *Attorney, Agent, or Firm* — Sarah Hegi Simpson; McWhorter, Cobb & Johnson, LLP (57) ABSTRACT

A device for transporting a cooler is disclosed herein. The disclosed cooler transporting device generally comprises a cooler attached to a u-shaped shoe member, the shoe member including a base surface, a first end surface and a second end surface; a wheel attachment member attached to the first end surface of the shoe member; one or more wheels attached to the wheel attachment member; a first locking member attached to the first end surface of the shoe member that couples the first end surface of the shoe member to the cooler; and a second locking member attached to the second end surface of the shoe member that couples the second end surface of the shoe member to the cooler. The disclosed cooler transporting device may be utilized to easily and quickly convert a non-wheeled cooler into a wheeled cooler.

20 Claims, 6 Drawing Sheets

(56) References Cited

U.S. PATENT DOCUMENTS

| | | | |
|---|---|---|---|
| 6,042,127 A * | 3/2000 | Rupolo | 280/33.998 |
| 6,109,644 A * | 8/2000 | Cox | B62B 1/20 |
| | | | 280/47.24 |
| 6,311,991 B1 | 11/2001 | Conrado et al. | |
| 6,364,329 B1 * | 4/2002 | Holub | A45C 5/14 |
| | | | 280/47.26 |
| 6,923,468 B1 * | 8/2005 | Barnett et al. | 280/651 |
| 7,207,576 B1 * | 4/2007 | Ibarra | 280/47.21 |
| 7,284,763 B1 * | 10/2007 | King | 280/47.26 |
| 7,347,429 B2 * | 3/2008 | Murillo | B62B 1/10 |
| | | | 280/47.131 |
| 7,762,566 B2 * | 7/2010 | Wang | 280/79.7 |
| 7,854,321 B2 * | 12/2010 | Twig | B25H 3/023 |
| | | | 206/372 |
| 8,123,236 B1 * | 2/2012 | Helenihi | 280/35 |
| 8,783,698 B1 * | 7/2014 | Elizondo | B62B 5/00 |
| | | | 280/47.34 |
| 2003/0071429 A1 * | 4/2003 | Bradshaw | 280/87.041 |
| 2008/0001373 A1 | 1/2008 | Vaughn | |
| 2008/0066819 A1 * | 3/2008 | Attanasio | 137/899 |
| 2008/0224010 A1 * | 9/2008 | Roth et al. | 248/311.2 |
| 2009/0026735 A1 * | 1/2009 | Watzke | 280/652 |
| 2012/0273505 A1 * | 11/2012 | Bose | A45C 5/14 |
| | | | 220/592.16 |
| 2013/0062356 A1 * | 3/2013 | Deka | 220/592.25 |
| 2013/0200581 A1 | 8/2013 | Vanderberg et al. | |
| 2015/0115555 A1 * | 4/2015 | Cates | 280/47.26 |

* cited by examiner

COOLER TRANSPORTING DEVICE

BACKGROUND OF THE INVENTION

1. Field of the Invention

The present invention generally relates to insulated containers such as portable coolers. More specifically, the present invention relates to a device for transporting portable coolers and the like.

2. Description of Related Art

Portable coolers are often used to transport food, beverages and ice to various outdoor activities such as sporting events, picnics, camping trips, etc. When fully loaded with food, beverages and ice, however, the requirement to carry a loaded cooler long distances to a desired location tempers the fun of such activities.

In order to improve the transportability of coolers, some portable coolers are made with wheels. Wheeled coolers typically include a pair of wheels coupled to an axle that extends through an axle aperture formed through a bottom portion of the cooler. Such wheeled coolers usually include recesses in the side insulated walls where the wheels are attached so that the wheels do not protrude too far beyond the walls of the cooler.

Design problems in wheeled coolers present several disadvantages that encourage many manufacturers to make non-wheeled coolers. For instance, by configuring coolers to include wheels, the amount of insulation in the side walls and/or the bottom wall is greatly decreased, which thereby decreases the effectiveness of the cooler. Also, at the outdoor activities at which coolers are most often used, people often sit on top of closed coolers and use coolers as a seat. Wheeled coolers, however, cannot be used as a seat because sitting on top of such a cooler will cause the cooler to roll and could injure the user by causing the user to fall off the cooler. Also, the wheels and axles of such coolers are prone to breakage and attempting to sit on top of such a cooler, or pulling the cooler over rough ground surfaces, often breaks the axles and/or the wheels on such coolers. Moreover, when wheeled coolers are placed on a non-flat surface, in a car, or on a boat, such coolers roll around and are difficult to maintain in a stationary position.

As a result of these problems, many popular and widely used coolers are not made to include wheels. Non-wheeled coolers typically have better and more uniform insulation in the cooler walls compared to wheeled coolers. Plus, non-wheeled coolers typically are longer lasting, more durable, and include less parts that are prone to breakage compared to wheeled coolers. Users can sit on top of non-wheeled coolers and such coolers remain in a stationary position even when place on a non-flat surface, in a car, or on a boat.

The main problem with large, non-wheeled coolers, however, is that they are heavy and it is practically impossible for one person to carry such a cooler when it is loaded with food, beverages and ice. Therefore, a need exists for a cooler transporting device that improves the transportability of non-wheeled coolers by easily and quickly converting a non-wheeled cooler into a wheeled cooler. A cooler transporting device is needed that can be attached to a cooler to help transport it and that can be detached from the cooler when the cooler has reached its destination. While enhanced mobility is needed for transporting non-wheeled coolers, the coolers must also be stable when stationary, easy to store, and durable. Also, the effectiveness of the cooling properties of the cooler should not suffer as a result of enhancing the mobility of the cooler. A cooler transporting device is further needed that allows one user to easily transport a cooler from one place to another without requiring assistance from another person.

In view of the foregoing, it is apparent that a need exists in the art for a cooler transporting device which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above described drawbacks associated with current devices. To achieve these and other advantages and in accordance with the purpose of the invention, as embodied and broadly described, the present disclosure describes a device for transporting non-wheeled coolers and the like.

The disclosed device generally comprises a cooler attached to a U-shaped shoe member that includes a base surface, a first end surface and a second end surface; a wheel attachment member attached to the first end surface of the shoe member; and one or more wheels attached to the wheel attachment member.

The configuration of the disclosed device provides many advantages over current wheeled and non-wheeled portable coolers. Specifically, the disclosed cooler transporting device improves the transportability of non-wheeled coolers by effortlessly converting a non-wheeled cooler into a wheeled cooler. The cooler transporting device can be easily attached to a cooler to transport the cooler to a desired location. The device can then be easily detached from the cooler when the cooler has reached its destination.

Even when the disclosed cooler transporting device remains attached to the cooler, the device is configured to overcome many of the problems experienced with conventional wheeled coolers. For example, the base surface of the shoe member is preferably configured so that, even when the disclosed device is attached to a cooler, the bottommost part of the base surface of the shoe member does not extend past the nonslip feet on the cooler so that the feet remain in contact with the ground to prevent the cooler from rolling or inadvertently moving when it is not being transported by a user.

Currently, users may use a wheeled dolly or cart to move a non-wheeled cooler from one location to another. However, dollies are large and cumbersome and take up too much room when not in use. Unlike dollies, the disclosed device is designed to take up only slightly more room than the cooler itself and the device is easy to store whether it is stored attached to or detached from the cooler.

Another advantage of the disclosed device is that it securely attaches wheels to a cooler without permanently attaching to or altering the cooler. As a result, the cooling properties of the cooler remain unchanged upon attaching the disclosed device to the cooler and the cooler is much easier to transport.

A further advantage is that the disclosed device allows one user to easily transport a cooler from one place to another without requiring help from another person. As a result, the disclosed device increases the mobility and hence the utility of standard, non-wheeled coolers. At the same time, the disclosed cooler transporting device is durable and is not prone to breakage like many wheeled coolers currently on the market.

These, together with other objects of the invention, along with various features of novelty that characterize the invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

The terms "top," "bottom," "front," "rear," and "side" are used in the specification to describe the embodiment of the invention as illustrated in the accompanying Figures. It should be appreciated that in actual use, an embodiment of the invention may be rotated as needed to accomplish the objectives of the invention. As a result of such rotation, the various terms used herein of "top," "bottom," "front," "rear," "side," and the like may not literally apply to a particular arrangement. Such terms are relative and are used herein to describe the Figures for illustration purposes only and are not intended to limit the embodiments shown to any particular orientation.

Referring now to FIGS. 1-11, an exemplary embodiment of a cooler transporting device 20 in accordance with the present disclosure is illustrated. As shown in the accompanying Figures, a cooler transporting device 20 according to the present disclosure generally includes a cooler 21 attached to a U-shaped shoe member 41, said shoe member 41 including a base surface 42, a first end surface 43, and a second end surface 44; a wheel attachment member 45 attached to the first end surface 43 of the shoe member 41; one or more wheels 40 attached to the wheel attachment member 45; a first locking member 55a attached to the first end surface 43 of the shoe member 41 for coupling the shoe member 41 to the cooler 21; and a second locking member 55b attached to the second end surface 44 of the shoe member 41 for coupling the shoe member 41 to the cooler 21.

As illustrated in the attached Figures, the disclosed cooler transporting device 20 includes a cooler 21 attached thereto. The cooler 21 is preferably a conventional, non-wheeled cooler. The cooler 21 includes a cooler body 29 and a cooler lid 27. The cooler body 29 includes a front wall 22, a rear wall 23, a first side wall 24, a second side wall 25, and a bottom wall 26. In one exemplary embodiment, the cooler body 29 may be generally configured in a rectangular shape; however, those of ordinary skill in the art will recognize that several other shapes can be employed for the cooler body 29 of the present invention. The cooler body 29 further includes an upper peripheral edge 36 that extends around the top portion of the front wall 22, the rear wall 23 and the side walls 24 and 25.

Figure 1:
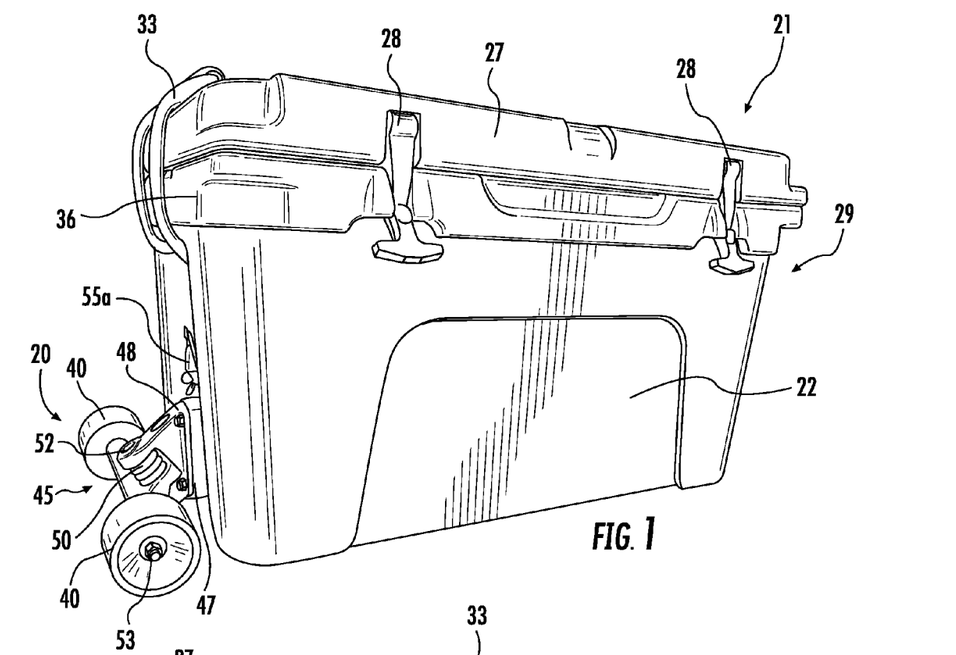
FIG. 1 is a front perspective view of a cooler transporting device constructed in accordance with the teachings of the present disclosure.
Figures 3, 4:
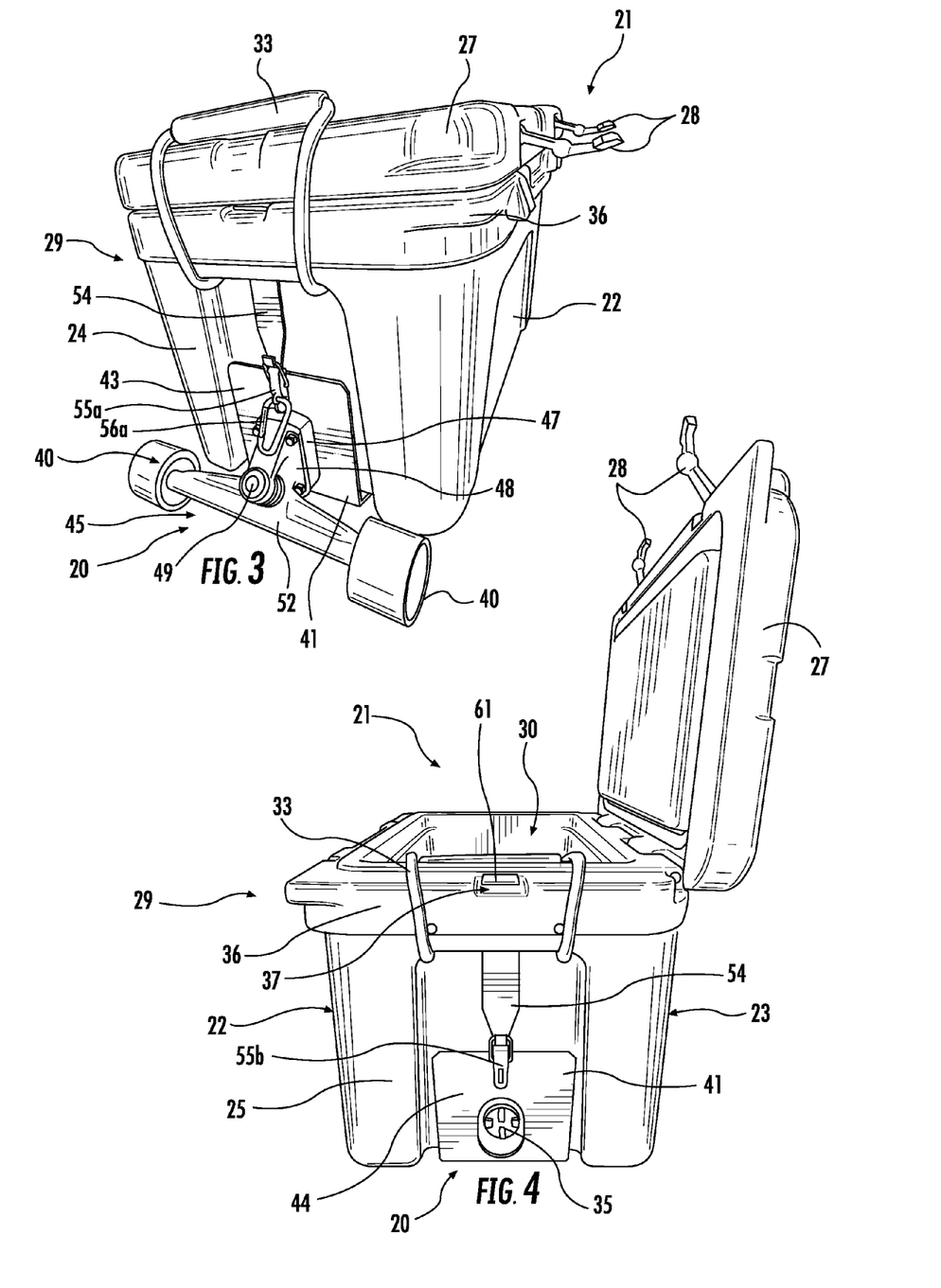
FIG. 3 is a first end perspective view of the device shown in FIG. 1.
FIG. 4 is a second end perspective view of the device shown in FIG. 1.

The cooler lid 27 sits on top of the upper peripheral edge 36 of the cooler body 29. The cooler lid 27 may be attached to the cooler body 29 using known attachment methods, such as hinges on one side and one or more latches 28 on the opposite side of the lid 27. The latches 28 are configured to selectively retain the lid 27 in its closed position as illustrated in FIG. 1. As shown in FIG. 4, the latches 28 can be unlatched in order to open the lid 27 from its closed position to an open position to access the interior 30 of the cooler body 29.

Figure 6:
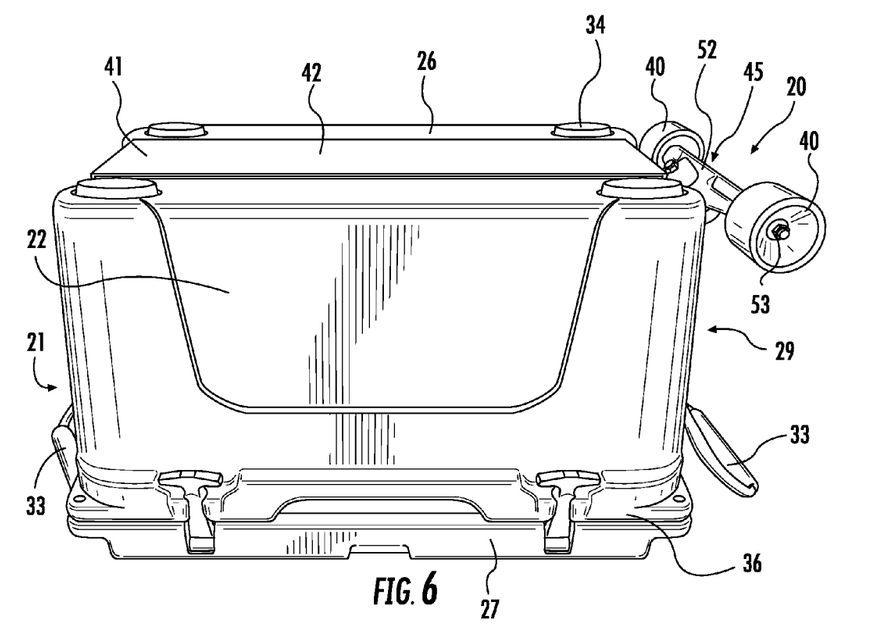
FIG. 6 is a bottom perspective view of the device shown in FIG. 1.
Figure 7:
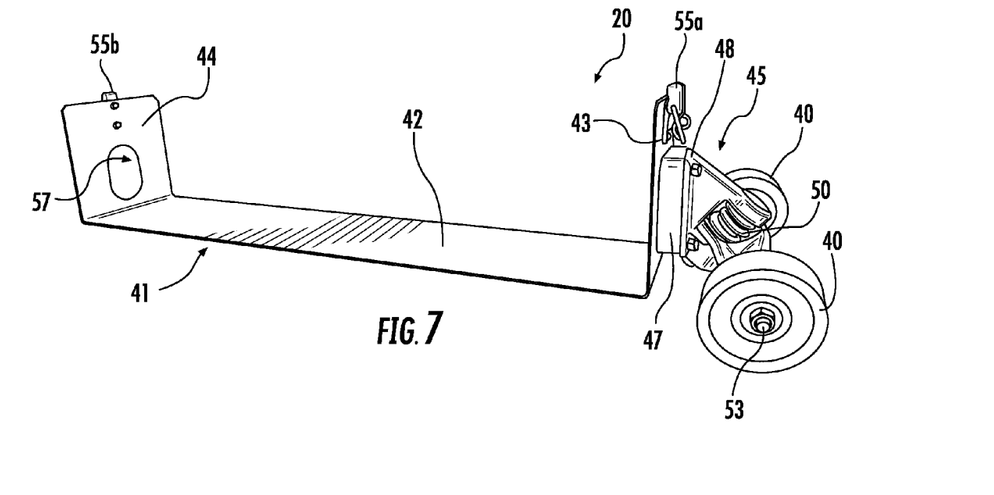
FIG. 7 is a perspective view of the device shown in FIG. 1, showing the cooler transporting device without a cooler attached thereto.

As shown in the attached Figures, the cooler 21 preferably includes handles 33 on the opposed first side wall 24 and second side wall 25. The cooler 21 may also include a drain plug 35 formed through the second side wall 25 to allow for the selective draining of any liquid that accumulates within the interior 30 of the cooler body 29. As shown in FIG. 6, the bottom wall 26 of the cooler 21 may further include nonslip feet 34 for holding the cooler 21 in a stationary position when the feet 34 are placed on a ground surface.

As illustrated in the accompanying Figures, the disclosed cooler transporting device 20 includes a U-shaped shoe member 41. The shoe member 41 generally includes a base surface 42, a first end surface 43 and a second end surface 44. The base surface 42 of the shoe member 41 is long enough to extend the length of the bottom wall 26 of the cooler 21, and the opposing end surfaces 43 and 44 of the shoe member 41 extend up a portion of the opposing side walls 24 and 25 of the cooler 21. The width of the shoe member 41 is preferably less than the width of the bottom wall 26 of the cooler 21, as illustrated in FIG. 6. The length and width of the shoe member 41 will vary depending on the size and configuration of cooler used.

The material used to make the shoe member 41 is preferably a thin material so that when the disclosed device 20 is attached to a cooler 21, the bottommost part of the base surface 42 of the shoe member 41 does not protrude past the nonslip feet 34 on the bottom wall 26 of the cooler 21, which allows the feet 34 to remain in contact with the ground to prevent the cooler 21 from rolling or inadvertently moving when it is not being transported by a user. In most preferred embodiments, the material used to make the shoe member 41 is equal to or less than 0.25 inches thick. In many preferred embodiments, the material used to make the shoe member 41 is approximately 0.0625 inches thick. In one of the embodiments contemplated by the present disclosure, the shoe member 41 disclosed herein is made of stainless steel sheet metal. In alternative embodiments, the shoe member 41 may be made of other suitable, durable materials and may be provided in various lengths and widths depending on the size and configuration of cooler 21 used.

In another embodiment contemplated by the present disclosure, nonslip material (e.g., nonslip strips or nonslip sheets) is attached to the shoe member 41 on the shoe member 41 surfaces that are disposed against the cooler 21. The nonslip material (not illustrated) may be added to the base surface 42 and/or the opposing end surfaces of the shoe member 41 to allow the shoe member 41 to form a tighter grip or attachment to the cooler 21.

Figure 2:
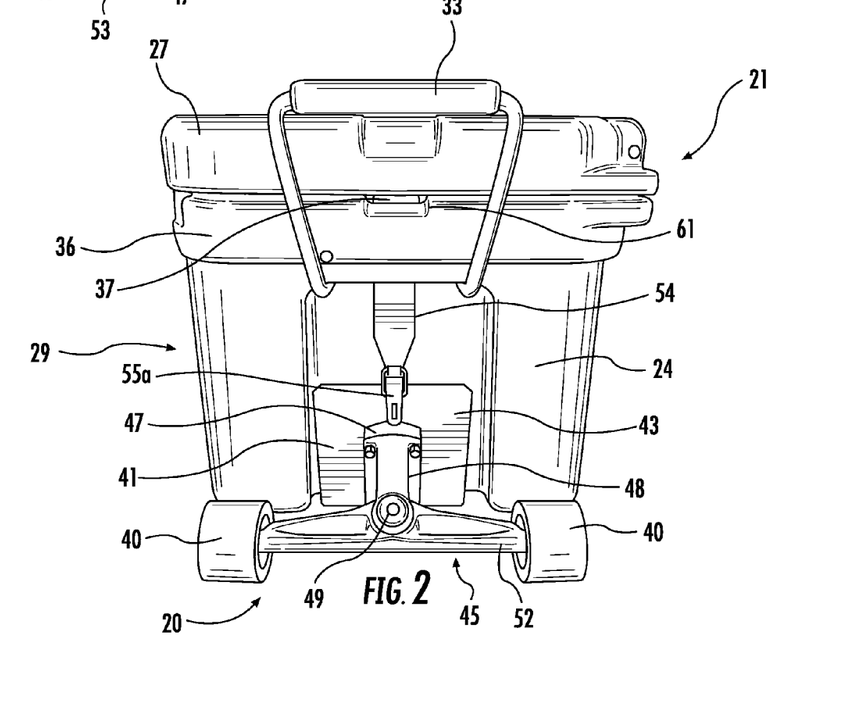
FIG. 2 is a first end perspective view of the device shown in FIG. 1.
Figure 8:
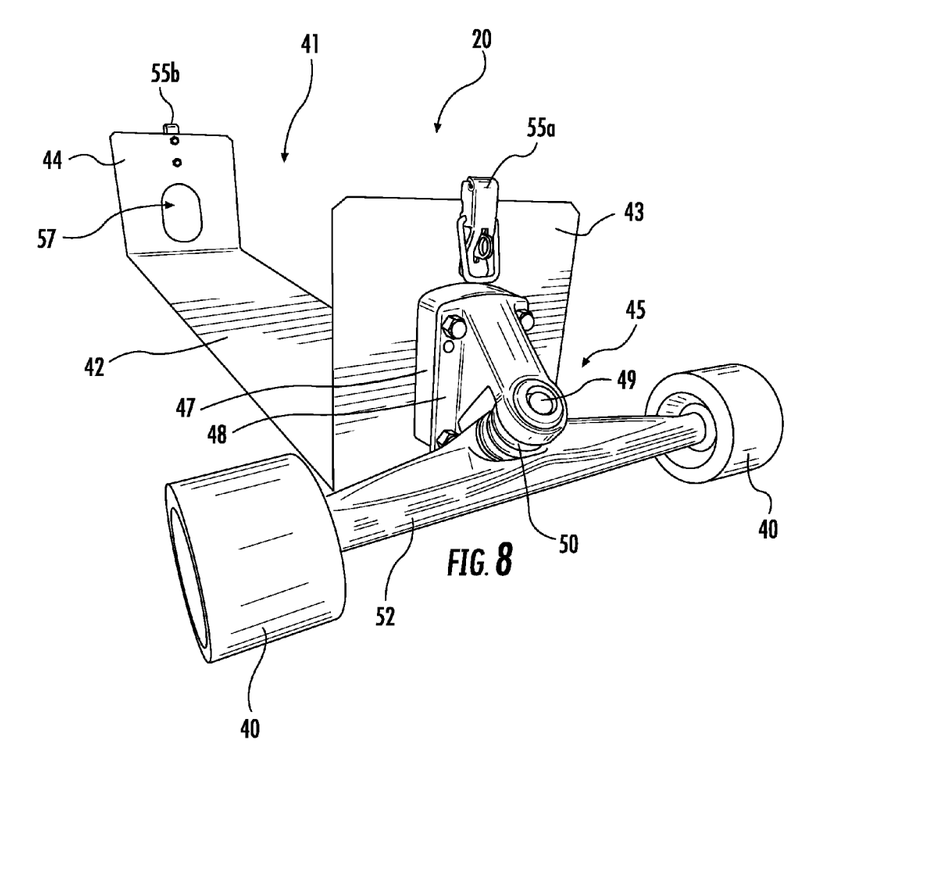
FIG. 8 is a first end perspective view of FIG. 7.
Figure 9:
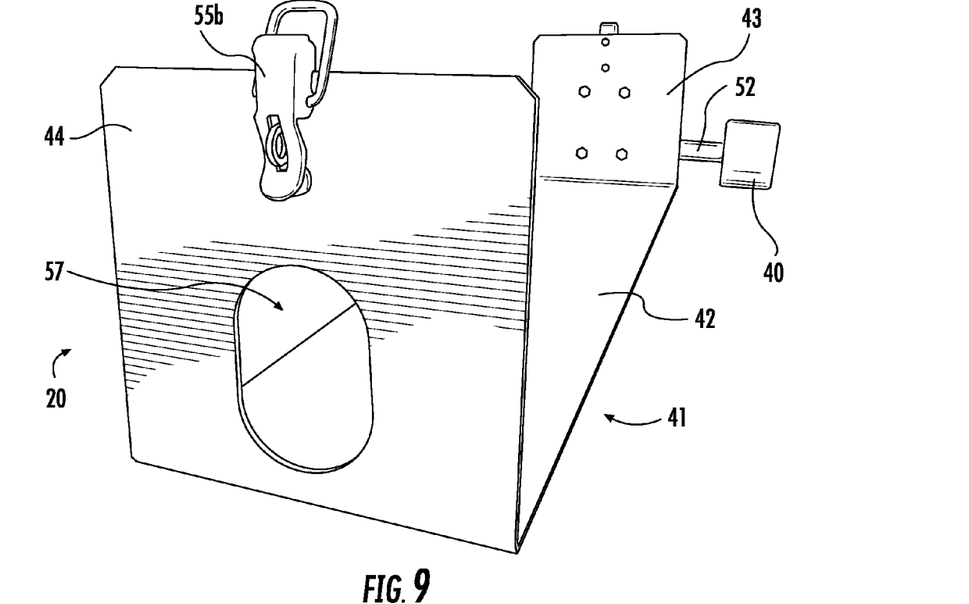
FIG. 9 is a second end perspective view of FIG. 7.

Turning to FIGS. 2, 3 and 8, a wheel attachment member 45, which attaches wheels 40 to the shoe member 41, is attached to the first end surface 43 of the shoe member 41. The wheel attachment member 45 may be attached to the first end surface 43 via fasteners that extend through mounting holes formed through the wheel attachment member 45 and formed through the first end surface 43, or the wheel attachment member 45 may be attached to the first end surface 43 via any other attachment means known to those skilled in the art.

In the embodiment depicted in the attached drawings, the wheel attachment member 45 includes a baseplate 48 fastened to the first end surface 43 of the shoe member 41. A spacer or riser pad 47 may be disposed between the first end surface 43 of the shoe member 41 and the baseplate 48 to prevent the wheels 40 from rubbing against the cooler 21 (see FIG. 11). The wheel attachment member 45 further includes one or more legs 52 that are configured for attaching one or more wheels 40 to each leg 52. The wheels 40 included with the disclosed device 20 are suitably selected for outdoor use and are capable of moving heavy loads along hard, semi-hard, or even soft ground surfaces.

In the embodiment shown in the attached drawings, the disclosed device 20 includes two legs 52, each having an axle 53 and a wheel 40 attached to each axle 53. The wheels 40 can be held in place with an axle cap, lug nut, or other fastener known to those skilled in the art, which allows the wheels 40 to freely rotate about the axle 53. While the illustrated embodiments show a wheel attachment member 45 that includes two wheels 40, it should be appreciated that other embodiments are contemplated wherein greater or lesser numbers of legs 52, axles 53 and/or wheels 40 are utilized for rolling the cooler 21 over a ground surface. Those skilled in the art will recognize that the disclosed device 20 can be easily modified to include only one wheel 40 or to include more than two wheels 40. Additionally, one or more wheels 40 may be attached to each axle 53.

As shown in the accompanying drawings, the wheel attachment member 45 may be defined as a skateboard truck. Skateboard trucks are the devices by which wheels 40 are connected to the deck of a skateboard. Skateboard trucks have several basic components. Generally, the basic components of a conventional skateboard truck include a baseplate 48, a hanger 52 that is coupled to the baseplate 48, an axle 53 extending from or through the hanger 52 for mounting the wheels 40 to the truck, and a kingpin 49 for coupling the hanger 52 to the baseplate 48. The ease of movement of the hanger 52 is generally adjusted by a kingpin nut threaded onto the end of the kingpin 49. Generally, two kingpin bushings are located about the kingpin 49, with the kingpin nut securing the kingpin bushings. In the attached Figures, the kingpin 49 is surrounded by a resilient member or a spring 50, which is another element that may be included as a basic component of conventional skateboard trucks.

While a skateboard truck may define the wheel attachment member 45 of the disclosed device 20, it should be appreciated that the wheel attachment member 45 is not limited to a skateboard truck. Many different wheel attachment members 45 may be used with the disclosed device 20 to attach one or more wheels 40 to the shoe member 41, all of which are considered to be within the spirit and the scope of the present invention.

The first end surface 43 of the shoe member 41 further includes a first locking member 55a for coupling the first end surface 43 of the shoe member 41 to the cooler 21. The first locking member 55a may define a draw pull latch, as illustrated in the attached Figures. Additionally, the second end surface 44 of the shoe member 41 further includes a second locking member 55b for coupling the second end surface 44 of the shoe member 41 to the cooler 21. The second locking member 55b may also define a draw pull latch, as illustrated in the attached Figures. It should be appreciated that the locking members 55a and 55b can be configured in various ways in order to couple the opposing end surfaces 43 and 44 of the shoe member 41 to the cooler 21, all of which are considered to be within the spirit and scope of the present disclosure.

Figure 10:
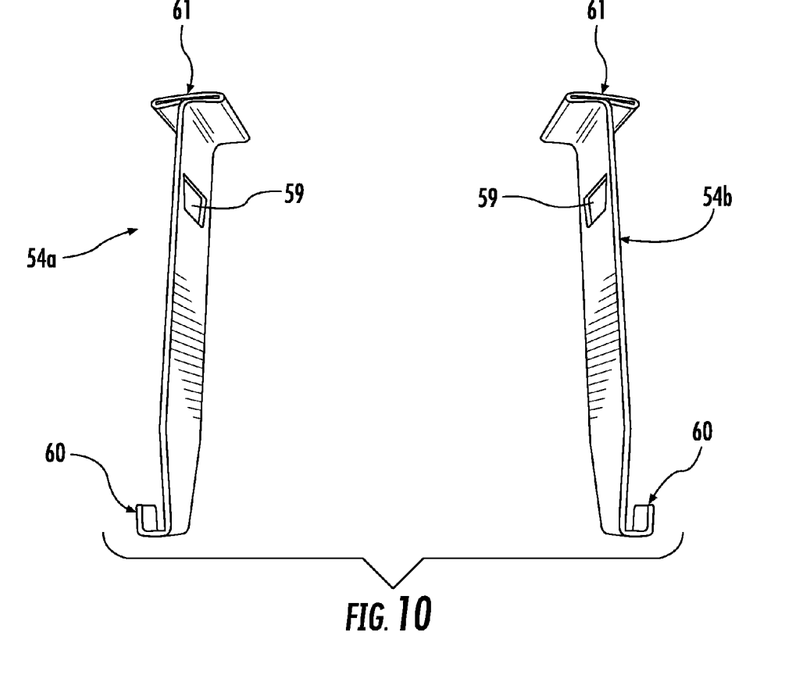
FIG. 10 is a perspective view of attachment arms of the disclosed cooler transporting device constructed in accordance with the teachings of the present disclosure.
Figure 11:
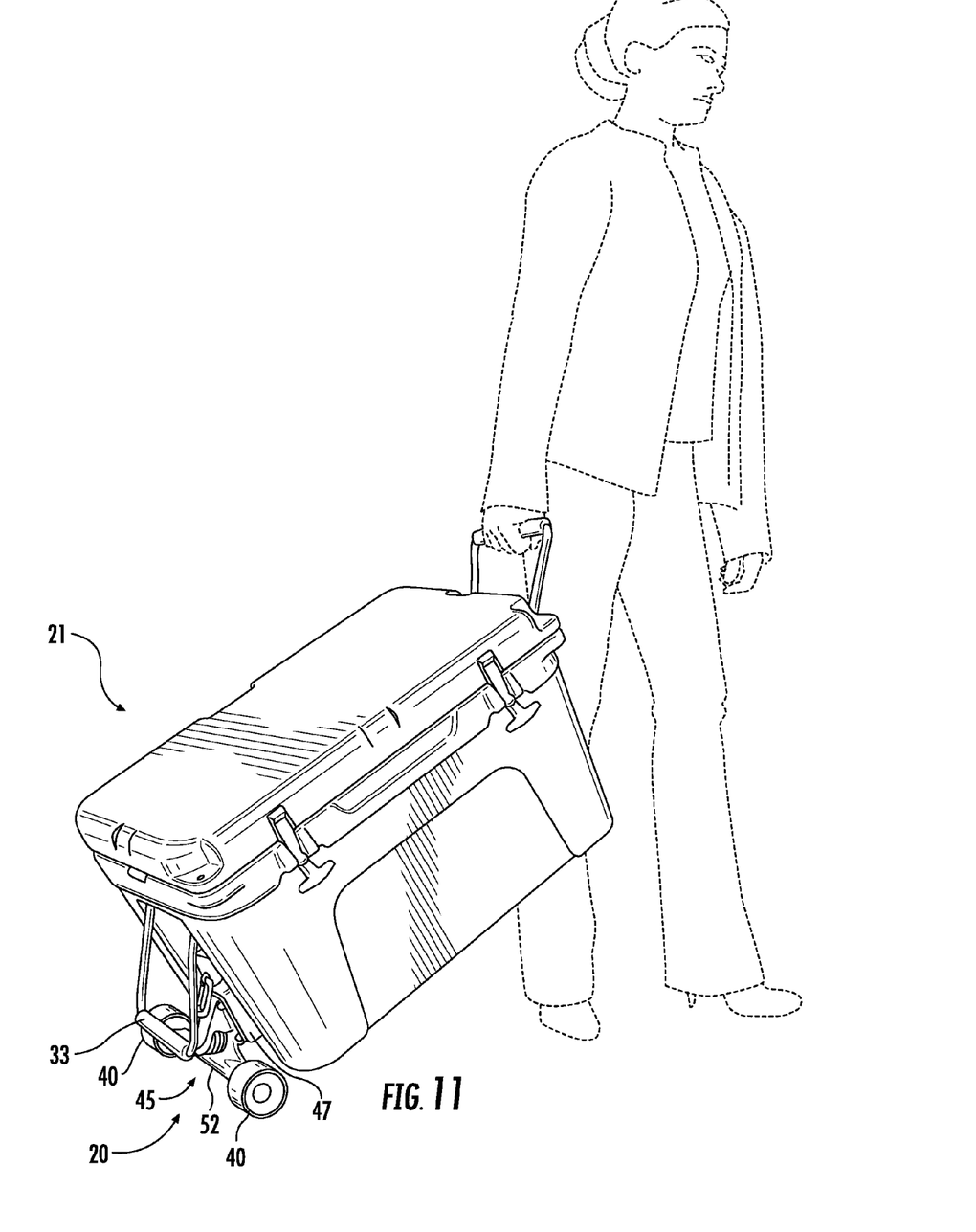
FIG. 11 is a perspective view of the device shown in FIG. 1, showing the device being transported by a user.

The disclosed device 20 may further include a first attachment arm 54a and a second attachment arm 54b that can be coupled to the cooler 21 and attached to the first locking member 55a and the second locking member 55b, respectfully, in order to attach the shoe member 41 to the cooler 21. FIG. 10 illustrates the first attachment arm 54a and the second attachment arm 54b, which each may include a shoulder 61 positioned at the top portion of the arm 54, a bottle opener 59 formed through the central portion of the arm 54, and a hook 60 formed at the bottom portion of the arm 54.

Figure 5:
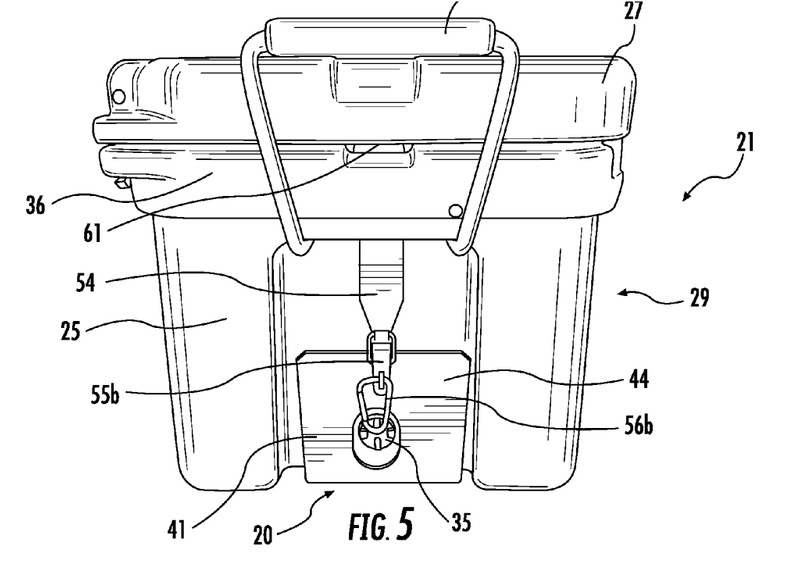
FIG. 5 is a second end perspective view of the device shown in FIG. 1.

Many coolers, such as the cooler 21 illustrated in the attached drawings, include apertures 37 (e.g., tie-down slots), which are formed through the upper peripheral edges 36 of the first side wall 24 and the second side wall 25 of the cooler 21, for tying down and securing the cooler 21 to an automobile, boat, trailer, etc. As can be seen in FIGS. 2, 4 and 5, the disclosed attachment arms 54a and 54b can be inserted through such apertures 37. The shoulder 61 of each attachment arm 54 prevents the attachment arm 54 from inserting all the way through the aperture 37 and holds the attachment arm 54 in place.

In order to attach the disclosed cooler transporting device 20 to the cooler 21 as shown in the attached Figures, first, the cooler 21 is placed or slid into the shoe member 41 so that the first end surface 43 of the shoe member 41 is disposed against the first side wall 24 of the cooler 21, the base surface 42 of the shoe member 41 is disposed against the bottom wall 26 of the cooler 21, and the second end surface 44 of the shoe member 41 is disposed against the second side wall 25 of the cooler 21. Next, the first attachment arm 54a is inserted through the aperture 37 in the upper peripheral edge 36 of the first side wall 24 of the cooler 21 until the shoulder 61 of the first attachment arm 54a is resting upon the upper peripheral edge 36. Next, the second attachment arm 54b is inserted through the aperture 37 in the upper peripheral edge 36 of the second side wall 25 of the cooler 21 until the shoulder 61 of the second attachment arm 54b is resting upon the upper peripheral edge 36. Once the attachment arms 54a and 54b are in place, the first locking member 55a is coupled to the hook 60 of the first attachment arm 54a (see FIG. 2), and the second locking member 55b is coupled to the hook 60 of the second attachment arm 54b (see FIG. 4). Finally, once the locking members 55a and 55b are coupled to the attachment arms 54a and 54b, a first fastener 56a (e.g., a lock, clip, clasp, etc.) can be attached to the first locking member 55a to fasten the first locking member 55a to the first attachment arm 54 (see FIG. 3), and a second fastener 56b (e.g., a lock, clip, clasp, etc.) can be attached to the second locking member 55b to fasten the second locking member 55b to the second attachment arm 54 (see FIG. 5).

As illustrated in FIGS. 4-5 and 7-9, the second end surface 44 of the shoe member 41 may further include a drain plug hole 57 that allows a user to access the drain plug 35 even with the disclosed cooler 21 transporting device attached to the cooler 21 so as not to hinder the selective draining of any liquid that may accumulate within the interior 30 of the cooler body 29.

It is important to note that the construction and arrangement of the elements of the device provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other uses, features, modifications and variations are, therefore, considered to be a part of this invention, the scope of which is to be determined by the following claims.

The invention claimed is:

1. A cooler transporting device for transporting a cooler over a solid surface, said cooler transporting device comprising:
    said cooler including a cooler body and a cooler lid, said cooler body including a front wall, a rear wall, a first side wall, a second side wall, and a bottom wall, said bottom wall including one or more nonslip feet attached thereto;
    a solid u-shaped shoe member attached to said cooler, said shoe member including a base surface extending along the bottom wall of said cooler, a first end surface, and a second end surface, wherein said shoe member is made from a thin material having a thickness of less than the distance from the bottom wall of the cooler to the bottom of said nonslip feet, such that said nonslip feet of said cooler protrude past the bottommost portion of said base surface to allow said one or more feet to engage said solid surface;
    a wheel attachment member attached to said first end surface of said shoe member;
    one or more wheels attached to said wheel attachment member;
    a first locking member attached to said first end surface of said shoe member that couples said first end surface of said shoe member to said cooler; and
    a second locking member attached to said second end surface of said shoe member that couples said second end surface of said shoe member to said cooler;
    wherein when said one or more wheels engage said solid surface and when said one or more feet engage said solid surface, said feet act as a brake holding said cooler in a stationary position.

2. The device according to claim 1, wherein the length of said base surface of said shoe member is long enough to extend the length of said bottom wall of said cooler, and the width of said base surface of said shoe member is less than the width of said bottom wall of said cooler.

3. The device according to claim 1, wherein said shoe member is attached to said cooler in a manner in which said first end surface of said shoe member is disposed against said first side wall of said cooler, said base surface of said shoe member is disposed against said bottom wall of said cooler, and said second end surface of said shoe member is disposed against said second side wall of said cooler.

4. The device according to claim 1, wherein said shoe member includes nonslip material attached thereto.

5. The device according to claim 1, wherein said wheel attachment member includes a baseplate fastened to said first end surface of said shoe member.

6. The device according to claim 5, further including a riser pad disposed between said first end surface of said shoe member and said baseplate.

7. The device according to claim 1, wherein said wheel attachment member includes one or more legs that are configured for attaching said one or more wheels to each of said one or more legs.

8. The device according to claim 1, wherein said wheel attachment member includes two legs, said legs each including an axle and a wheel attached thereto.

9. The device according to claim 1, wherein said wheel attachment member is defined as a skateboard truck.

10. The device according to claim 1, wherein said first locking member defines a draw pull latch and said second locking member defines a draw pull latch.

11. The device according to claim 1, further comprising one or more attachment arms that each include a shoulder positioned at the top portion of said attachment arm and a hook formed at the bottom portion of said attachment arm.

12. The device according to claim 1, wherein the width of said base surface is equal to the width of said first end surface and the width of said second end surface.

13. The device according to claim 1, wherein said shoe member defines a one-piece member that is bent up on opposite ends of said base surface to form said first end surface and said second end surface.

14. The device according to claim 1, wherein said cooler is transportable over said solid surface by lifting said second end surface to disengage said one or more nonslip feet from said solid surface and rolling said cooler on said one or more wheels over said solid surface.

15. A cooler transporting device, comprising:
    a cooler including a cooler body and a cooler lid, said cooler body including a front wall, a rear wall, a first side wall, a second side wall, and a bottom wall;
    a u-shaped shoe member attached to said cooler, said shoe member including a base surface, a first end surface, and a second end surface;
    a wheel attachment member attached to said first end surface of said shoe member;
    one or more wheels attached to said wheel attachment member;
    a first locking member attached to said first end surface of said shoe member that couples said first end surface of said shoe member to said cooler;
    a second locking member attached to said second end surface of said shoe member that couples said second end surface of said shoe member to said cooler;
    a first attachment arm including a shoulder positioned at the top portion of said first attachment arm and a hook formed at the bottom portion of said first attachment arm, said first attachment arm being coupled to said cooler and to said first locking member; and
    a second attachment arm including a shoulder positioned at the top portion of said second attachment arm and a hook formed at the bottom portion of said second attachment arm, said second attachment arm being coupled to said cooler and to said second locking member.

16. The device according to claim 15, wherein said cooler body further includes an upper peripheral edge extending around the top portion of said front wall, said first side wall, said rear wall, and said second side wall.

17. The device according to claim 16, wherein said cooler includes a first aperture formed through said upper peripheral edge of said first side wall and a second aperture formed through said upper peripheral edge of said second side wall, and wherein said first attachment arm is received through said first aperture until the shoulder of said first attachment arm rests upon said upper peripheral edge and said second attachment arm is received through said second aperture until the shoulder of said second attachment arm rests upon said upper peripheral edge.

18. The device according to claim 17, wherein said first locking member is coupled to said hook of said first attachment arm, and said second locking member is coupled to said hook of said second attachment arm.

19. The device according to claim 18, further comprising a first fastener attached to said first locking member that fastens the first locking member to the first attachment arm, and a second fastener attached to said second locking member that fastens the second locking member to said second attachment arm.

20. A cooler transporting device, comprising:
- a cooler including a cooler body and a cooler lid, said cooler body including a front wall, a rear wall, a first side wall, a second side wall, and a bottom wall, said cooler further comprising a drain plug;
- a u-shaped shoe member attached to said cooler, said shoe member including a base surface, a first end surface, and a second end surface;
- a wheel attachment member attached to said first end surface of said shoe member;
- one or more wheels attached to said wheel attachment member;
- a first locking member attached to said first end surface of said shoe member that couples said first end surface of said shoe member to said cooler; and
- a second locking member attached to said second end surface of said shoe member that couples said second end surface of said shoe member to said cooler;
- wherein said second end surface of said shoe member further comprises a drain plug hole which allows a user to access said drain plug when said shoe member is attached to said cooler.

* * * * *